V. L. DUHEM.
FILM MOVER AND SHUTTER FOR MOTION PICTURE MACHINES.
APPLICATION FILED MAY 31, 1910.
995,061.
Patented June 13, 1911.
2 SHEETS—SHEET 1.
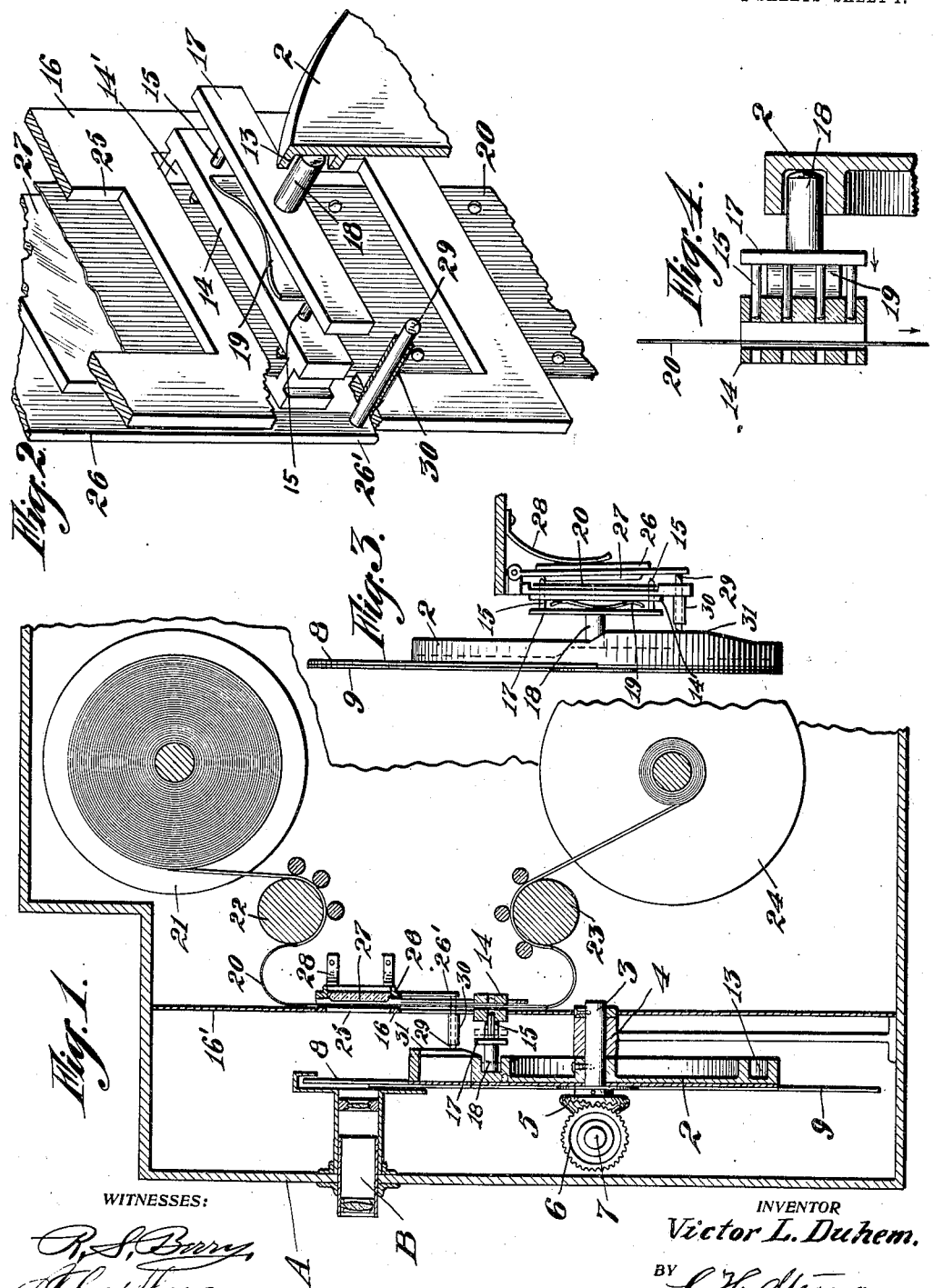
WITNESSES:
INVENTOR
Victor L. Duhem.
BY G. H. Strong.
ATTORNEY V. L. DUHEM.
FILM MOVER AND SHUTTER FOR MOTION PICTURE MACHINES.
APPLICATION FILED MAY 31, 1910.
995,061.
Patented June 13, 1911.
2 SHEETS—SHEET 2.
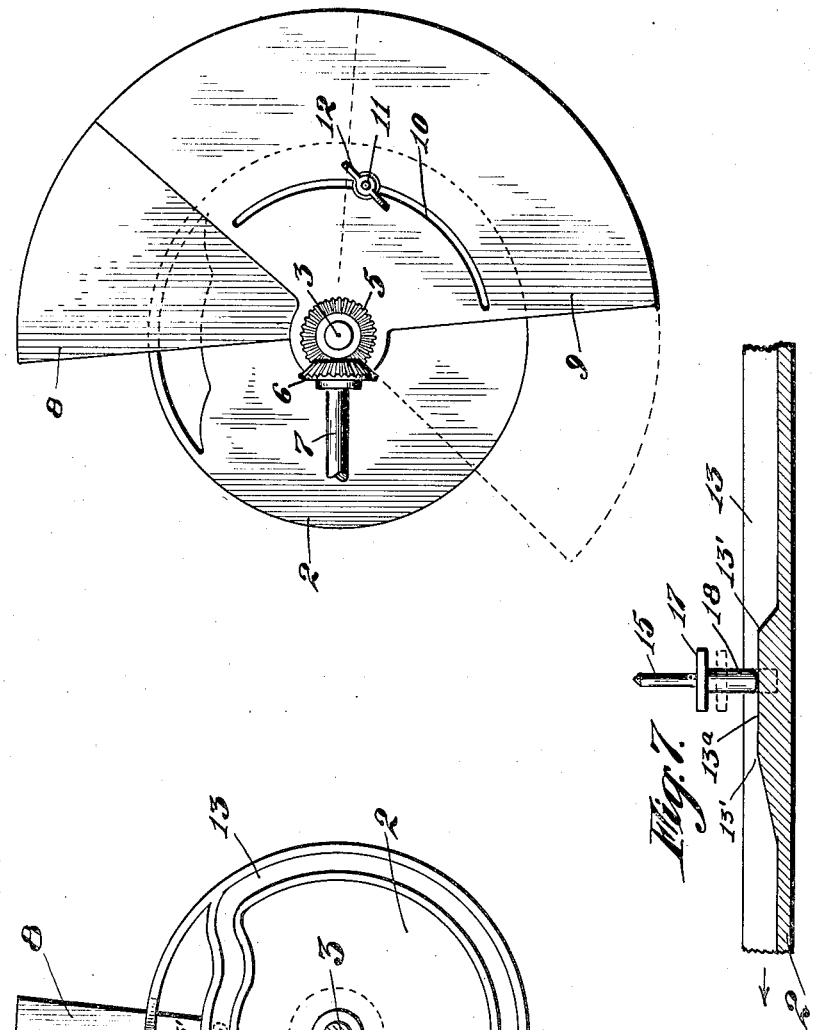
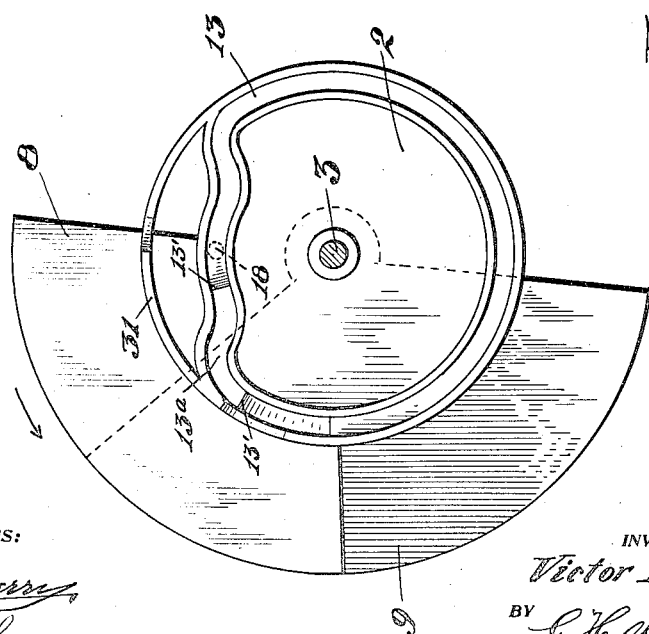
WITNESSES:
INVENTOR
Victor L. Duhem.
BY G. H. Strong.
ATTORNEY

UNITED STATES PATENT OFFICE.

VICTOR L. DUHEM, OF FRUITVALE, CALIFORNIA.

FILM-MOVER AND SHUTTER FOR MOTION-PICTURE MACHINES.

995,061.

Specification of Letters Patent. Patented June 13, 1911.

Application filed May 31, 1910. Serial No. 564,068.

*To all whom it may concern:*

Be it known that I, VICTOR L. DUHEM, a citizen of the United States, residing at Fruitvale, in the county of Alameda and State of California, have invented new and useful Improvements in Film-Movers and Shutters for Motion-Picture Machines, of which the following is a specification.

This invention relates to a film-moving device and shutter for use in the manufacture, reproduction and exhibition of moving-picture films.

It is the object of this invention to provide a film-moving device which is adapted for use in moving-picture cameras, printers and projectors, and which device is operated in conjunction with an adjustable shutter for making intermittent exposures on a film.

A further object is to provide a combined film-moving device and lens shutter, which is simple in construction, efficient in operation and inexpensive in manufacture, and which is designed for the purpose of producing accurate and perfect films for motion-picture exhibitions.

The invention consists of the parts and the construction and combination of parts as hereinafter more fully described and claimed, having reference to the accompanying drawings, in which—

Figure 1 is a vertical section of the invention as applied. Fig. 2 is a detail in perspective with parts broken away, showing the film-moving carriage. Fig. 3 is a plan view of the invention. Fig. 4 is a sectional view through a modified form of carriage. Fig. 5 is a detail in rear elevation of the actuating disk and shutter. Fig. 6 is a view in front elevation of the same. Fig. 7 is a diagram illustrating the cam surface on the carriage actuating disk.

In the drawings A represents the box or housing of a camera and B indicates the lens of same. Within the housing A and disposed at right angles to the lens B is a circular disk or plate 2 which is securely mounted on a shaft 3 revolubly sustained in a suitable bearing 4. This disk or fly-wheel 2 is adapted to be revolved by means of a beveled pinion 5 mounted on the shaft 3 which is rotated through a gear 6 on a shaft 7, which may be driven by any suitable means. The outer periphery of the fly-wheel 2 lies on a plane below the lens B while the face of the fly-wheel is substantially in a vertical line with the inner end of the lens casing.

Mounted on the face of the fly-wheel 2 or formed integral therewith is a rigid shutter plate 8 approximately in the form of a quadrant. This fixed, quadrantal plate 8 extends beyond the periphery of the fly-wheel 2 and is adapted to project above the inner end of the lens casing B, forming a shutter to prevent light rays from passing through the lens B into the interior of the box A during such time as the plate 8 is passing the lens during a revolution of the fly-wheel 2. An auxiliary plate 9 loosely mounted on the shaft 3 between the pinion 5 and the fly-wheel 2 rests against the face of the fly-wheel 2 and plate 8. This auxiliary plate 9 is adapted to be rotated on its pivotal mounting, so as to extend or increase the area of the shutter surface of the plate 8. A segmental slot 10 is formed in the plate 9 through which a threaded stud 11 on the fly-wheel 2 projects. A wing-nut 12 is screwed on the projecting end of the stud 11, by the tightening of which the adjustable auxiliary shutter plate 9 may be retained in a stationary or fixed position.

The plates 8 and 9 constitute an adjustable shutter for the lens B, by means of which various timed exposures can be made. As the length of an exposure is governed by the length of the space between the outer edges of the shutter plates 8 and 9 in conjunction with the speed at which the fly-wheel 2 is revolved, it can be readily seen that by adjusting the plate 9 this space may be lengthened or shortened, as desired, to a certain extent, so as to give the required length of exposure. By this construction the fly-wheel 2 may be rotated at a fixed speed and the length of exposure regulated by adjusting the movable shutter plate 9.

A cam slot 13 is formed on the back of the fly-wheel 2, as shown in Fig. 5, for the purpose of operating a movable carriage 14, and film-perforating pins 15, Figs. 1 and 2. The carriage 14 is slotted longitudinally at 14' and slidably mounted on a vertical guide plate 16 secured to a partition 16' disposed across the camera box A. The perforating pins 15 are rigidly mounted on a plate 17 and are supported in perforations in the front plate of the carriage 14. A stud 18 formed on the plate 17 extends into the cam slot 13 on the back of the fly-wheel 2 and is normally retained in contact with the bottom surface of the slot by means of a plate-spring 19, which is interposed between the carriage 14 and the plate 17, which spring has a tendency to withdraw the perforating pins 15 from the carriage 14 and out of the slot 14'.

An unperforated photographic film 20 in the form of a ribbon is wound on a suitable reel 21 and after passing around a smooth direction roller 22 is directed downward at the rear of the partition 16' and passed through the slot 14' in the carriage 14, from whence it passes around another direction roller 23 to be wound upon a reel 24. The partition 16' and plate 16 are provided with an opening 25, the size of the required exposure on the film 20, which opening is located directly in line with the camera lens B, so that when the shutter 8 and 9 is removed from behind the lens, rays of light will pass through the lens and be thrown upon the film 20 through the opening 25 in the usual manner. A normally closed, spring-actuated, glazed, hinged gate 26 is provided on the back of the partition 16' and is adapted to bear against the back of the film 20 and press it against the plate 16, the point of contact being made on the outer edges of the film 20 adjacent to the opening 25 by means of a glass plate 27, which is mounted on the gate 26 and extends a short distance in front thereof. Springs 28 of any suitable description act to normally retain the gate 26 in a closed position and are of sufficient tension to bind the film 20 between the gate 26 and the plate 16 against easy movement, and act as a brake and yet not mar the film. Means are provided by which the gate 26 may be automatically opened a sufficient distance to release the film 20 when the latter is to be moved, as later described. This means consists of a loose pin 29, sliding at right angles to the gate (Fig. 3) in a guide sleeve 30 extending through the plate 16, one end of which pin is adapted to bear against an extension 26' on the gate 26, while the other end contacts with the fly-wheel 2. A cam surface 31 is provided on the fly-wheel 2, by which the pin 29 is caused to press against the extension 26' on the gate 26 in opposition to the springs 28 and thus release the film 20 synchronously with the downward movement of the film.

The operation of the invention is as follows: The carriage 14 being in its lowermost position on the frame 16, as shown in Fig. 1, the stud 18 projects into that portion of the cam slot 13 of shortest radius, as shown in Fig. 5. In Fig. 1 the stud 18 is shown as having just passed the shallowest portion of the slot 13, which shallow portion is indicated at 13ª and extends from 13' to 13', Fig. 5. Passing cam 13ª pin 18 drops into the deep portion of cam slot 13 by the action of spring 19 and the perforating pins 15 are withdrawn from the slot 14' in the carriage 14, and the film is released by the spring 19. As the fly-wheel 2 is rotated through the gears 5 and 6 in the direction of the arrow, Fig. 5, the stud 18 in following the cam slot 13 is moved upward when the radius of the cam slot lengthens into the position shown in dotted lines in Fig. 1, carrying the carriage 14 therewith. While retained in this uppermost position, the pins 15 are caused to penetrate the film 20 in the slot 14', when the pin 18 strikes the upraised portion 13ª in the section of short radius of the cam slot 13. At about the same time pin 29 encounters cam 31 to open the gate 26 and release the film. While the pins 15 are thus engaged with the film 20, the carriage 14 is caused to move downward and to return to its lowermost position by reason of the stud 18 following the portion of shortest radius of the cam slot 13, the pins 15 causing the film 20 to move therewith the length of the downward movement of the carriage 14, so as to expose a new surface of film across the opening 25 ready for another exposure. When the lowermost portion of the carriage 14 is reached, the stud 18 leaves the raised section 13ª and returns to its normal position with the pins 15 out of contact with the film 20; gate 26 again closes against the film and the parts are in position for a repetition of the movements just described. In this manner the film 20 is caused to move step by step downward in short impulsive movements (usually about sixteen a second) to be wound upon the reel 24 in any suitable manner. During the downward movement of the carriage 14 and the film 20, the gate 26 is thrown out of contact with the film 20, by means of the cam 31 and pin 29, as before described. The shutter 8 and 9 is so disposed on the fly-wheel 2 that while the carriage 14 and film 20 are moving downward, the lens B will be shut or closed, and the open space between the opposite ends of the shutter 8 and 9 passes the lens B while the film is held stationary by the spring gate 26. It is obvious that as many perforating pins 15 for engaging the film 20 may be mounted on the plate 17 as may be found convenient, such, for instance, as shown in Fig. 4.

From the foregoing it is apparent that, while the invention is shown and described as applied to a camera, it is equally applicable to use on printing or reproducing machines and also on projectors, the essence of the invention being in the mode of moving the film 20 in relation to the shutter 8 and 9.

One of the main features of this invention is the use of the fly-wheel with the cam slots for actuating the film-moving device, and the film-mover or carriage with its perforating pins for perforating the film. By this arrangement I can use an imperforate film, perforating it at its edges after the film is put into the machine, using the pins 15 to move the film step by step. Another feature is the use of the hinged gate or brake member to limit the movement of the film, and the cam 31 to release the gate so as to allow the film to move.

Having thus described my invention, what I claim and desire to secure by Letters Patent is—

1. A film-mover comprising the combination of a rotary part having a continuous cam groove, a carriage, means on the carriage engaging the groove whereby the carriage is reciprocated on the rotation of said part, and perforating means on the carriage operative on the rotation of said rotary part.

2. A film-mover comprising the combination of a rotary part having a continuous cam member, a carriage having means engageable by said cam member to reciprocate the carriage, and perforating means on the carriage operative by said cam member.

3. A film-mover comprising the combination of a rotary part having a continuous cam member, a carriage having means engageable by said cam member to reciprocate the carriage, perforating means on the carriage operative by said cam member, a spring-actuated brake member operative on the film alternately with the operation of said perforating means, and means for operating said brake member by said rotary part.

4. In a film-moving mechanism, the combination of a fly-wheel having a continuous cam groove, a carriage having a projection engaging in said groove to reciprocate the carriage on the rotation of the wheel, film-engaging means on the carriage, said last-named means including perforating pins, and means on the fly-wheel for operating said perforating pins.

5. In a film-moving mechanism, the combination of a fly-wheel having a continuous cam groove, a carriage having a projection engaging in said groove to reciprocate the carriage on the rotation of the wheel, film-engaging means on the carriage, said last-named means including normally retracted, spring actuated perforating pins, and means on the fly-wheel for operating the pins intermittently.

6. A film-mover comprising a rotating part having a continuous cam groove, a carriage, normally retracted, spring-actuated perforating pins on the carriage, and means connected with the carriage and with said pins and engaging in said cam groove to actuate the carriage and said pins.

7. A film-mover comprising a rotating part having a continuous cam groove, a carriage, normally retracted, spring-actuated perforating pins on the carriage, means connected with the carriage and with said pins and engaging in said cam groove to actuate the carriage and said pins, a gate to limit the movements of the film, and means actuated by the rotary part to operate said gate.

8. In a film-moving apparatus, the combination with an imperforate web, of guides for the same, a rotary fly-wheel, a shutter operated by the fly-wheel, a reciprocating carriage having pins to perforate the film, and means operated by the fly-wheel to reciprocate the carriage and also to actuate the pins.

9. In a film-moving apparatus, the combination with an imperforate web, of guides for the same, a rotary fly-wheel, a shutter operated by the fly-wheel, a reciprocating carriage having pins to perforate the film, means operated by the fly-wheel to reciprocate the carriage and also to actuate the pins, a hinged, spring-actuated presser member and gate intermittently engaging the film as a brake, and means operated by the fly-wheel to release said brake synchronously with the movement of the film by the carriage.

10. In a picture moving machine, the combination with an imperforate film, of a rotary part having an adjustable shutter traversing the lens, a film-moving carriage having perforating pins, and means operative by said rotary part to actuate the carriage and pins synchronously to give the film a step by step movement.

11. In a picture moving machine, the combination with an imperforate film, of a rotary part having an adjustable shutter traversing the lens, a film-moving carriage having perforating pins, means operative by said rotary part to actuate the carriage and pins synchronously to give the film a step by step movement, a spring-actuated brake member to limit the movements of the film, and means for operating the brake member from the rotary part synchronously with the operation of the perforating pins.

In testimony whereof I have hereunto set my hand in the presence of two subscribing witnesses.

VICTOR L. DUHEM.

Witnesses:
CHARLES A. PENFIELD,
E. G. BLASDEL.